March 14, 1939.  W. H. SILVER  2,150,660
LEVER
Filed Oct. 23, 1936
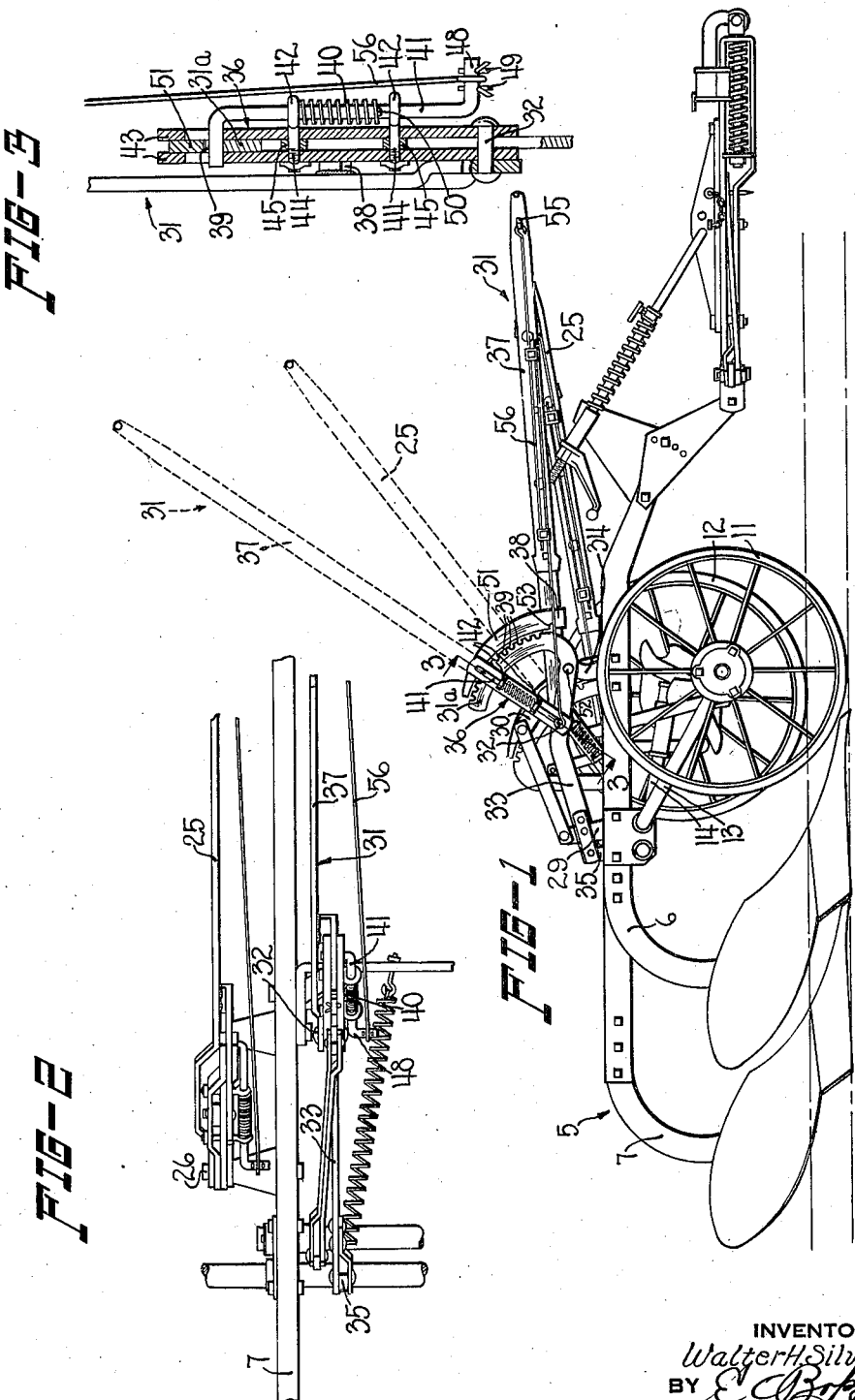
INVENTOR
Walter H. Silver.
BY
ATTORNEYS.

Patented Mar. 14, 1939

2,150,660

UNITED STATES PATENT OFFICE 2,150,660

LEVER

Walter H. Silver, Moline, Ill., assignor to Deere & Company, Moline, Ill., a corporation of Illinois Application October 23, 1936, Serial No. 107,157

17 Claims. (Cl. 74—524)

This invention is concerned with levers and pertains particularly to a type of two-piece lever which is adapted to be used on certain farm implements, such as plows, cultivators, etc., and which is so constructed that one member of the lever may be disconnected from the other member and be folded down in a substantially horizontal position upon the implement frame, after the implement has been adjusted to the desired operating position, to permit the implement to be operated under the low overhanging limbs of trees in orchards.

In the construction of implements of this general design, which are to be trailed behind a tractor, the levers are usually disposed adjacent the front of the implement within reach of the operator from his seat on the tractor. When the conventional type of one-piece lever is used on a structure of this kind, difficulty is sometimes experienced when traveling over ditches or uneven ground in that the implement and tractor jackknife, or swing toward each other, causing the lever to swing forwardly over the tractor. In some cases the operator has been struck in the back by the end of the lever swinging forwardly in this manner, and has been seriously injured thereby. Also, in other instances the lever has been bent or broken by coming in contact with some part of the tractor.

The main object of my invention is to provide a lever mechanism having a handle member which can be moved into a position of convenient operation when an adjustment is to be made, and which can be moved into an idle position after the adjustment has been made.

A more specific object of the invention is to construct a two-piece lever comprising a long handle member and a short locking member which are pivotally mounted on a common axis and disposed adjacent each other so that they may be connected together to swing as a single long lever when the implement is to be adjusted, after which the locking member may be locked to the locking sector and the handle member folded down upon the implement frame below the overhanging limbs of the trees, and in such a position that it cannot swing into the operator on the tractor seat.

Another object is to provide means to prevent the locking member becoming unlocked from the sector when the handle member is in a folded or idle position.

Other objects and advantages will be apparent to those skilled in the art after a consideration of the accompanying specification and drawing wherein:

Figure 1 is a side elevational view of a plow illustrating an application of my improved lever;

Figure 2 is a fragmentary plan view of a portion of the plow showing details of the novel lever; and, Figure 3 is a longitudinal sectional view of the lever taken on the plane of the line 3—3 of Figure 1.

I have shown my improved type of lever applied to a gang plow, although it will be understood that it may be advantageously incorporated with various other kinds of agricultural implements which are operated under conditions where the overhead clearance is limited.

The plow, which is indicated in its entirety by numeral 5, includes plow beams 6 and 7, supported on a furrow wheel 11 and a land wheel 12, which are journaled on the lower horizontal ends of furrow and land wheel crank axles 13 and 14, respectively. The plow 5 may be adjusted vertically to vary the operating depth and may be leveled to provide a uniform cut by means of a depth adjusting lever 25 and a leveling lever 31.

The levers 25 and 31 are shown as of similar construction, therefore a detailed description of one lever will suffice for both.

The lever 31 is pivotally mounted at 32 on a lever bar 33 and cooperates with a latch sector 31a whereby it may be secured in the desired position of adjustment. The lever 31 is connected to the furrow axle 13 by a connecting link which is pivotally attached to an arm 29 secured on the axle 13 and to an arm 30 fixed on the rear side of the lever 31. The lever bar 33 is disposed longitudinally of the implement and is pivotally supported at its front end by a link 34 which extends upwardly from the beam 7. A forward extension of the lever bar 33 is curved upwardly and rearwardly concentric with the pivot 32 to form the locking sector 31a. At its rear end lever bar 33 is pivoted to an arm 35 which is fixed to the land wheel axle 14.

The lever 31 is constructed of two members and includes a short locking member 36 and a relatively long handle member 37, both of which members are mounted on the pivot 32. A plurality of notches 39 are provided along the upper edge of sector 31a and these notches are adapted to be selectively engaged by a locking dog 41 which is slidably supported in a pair of guide members 42 secured on the locking member 36 of the lever 31. The guide members 42 are in the form of eyebolts, each of which has an eye portion of sufficient size to receive the locking dog 41 and a threaded bolt portion 44. The locking member 36 comprises two spaced parallel bars 43 disposed at opposite sides of the sector 31a and secured together by the bolt portions 44 of the guides 42 which project through aligned holes in the bars 43 and through spacers 45 provided between the bars 43. The spacers 45 are slightly longer than the thickness of sector 31a so that the bars 43 will be held out of clamping engagement with the sector 31a to permit the locking member 36 to move freely along the sector 31a.

The locking dog 41 is normally held in engagement with a selected one of the notches 39 by means of a compression spring 40 which is mounted on the dog 41 between the upper guide 42 and cotter pin 50 extending through a hole in dog 41.

To disengage the dog 41 from the sector 31a when it is desired to adjust the locking member 36 from one position to another to raise or lower the furrow wheel 11, the handle member 37 is swung into radial alignment with the locking member 36 (as shown in dotted lines in Figure 1), and the dog 41 is withdrawn from its engagement with a notch 39 in the sector 31a and is moved into engagement with a notch 53 formed on the inner edge of a bracket 38 fixed on the handle member 37. To facilitate disengaging the dog 41 from the sector 31a, a hand latch 55 is provided adjacent the outer end of the handle member 37 and is connected to the outer end of a latch rod 56. The inner end of rod 56 is pivotally connected to an arm 48 which extends outwardly laterally from the dog 41. The lever rod 56 is held on arm 48 by cotters 49 provided on the arm 48 at each side of rod 56. The arm 48 is arranged substantially coaxially with the pivot 32 to permit the handle member 37 to be swung into any desired position without affecting the position of latch 55.

When the dog 41 is engaged in notch 53, the locking member 36 and handle member 37 are thereby connected together and function as a single unit to adjust the locking member to the desired position. When the hand latch 55 is again released, the dog 41 is again drawn into the adjacent one of the notches 39 by the spring 40 to lock the member 36 to the sector 31a. When the locking member 36 is thus locked to the sector 31a, the handle member 37 is disconnected therefrom and may be swung down into an idle position. The idle position is determined by a pin 52 upon which the handle member 37 rests. Pin 52 is secured on the front end of bar 33 and extends laterally inwardly therefrom beyond the plane of the lever 31.

An arcuate shield formed by an extension 51 of bracket 38 is disposed over the sector 31a in close proximity thereto. Sufficient clearance is provided between the sector 31a and the shield 51 to permit the shield to freely move over the sector as the handle member 37 is swung up or down, but this space is not large enough to allow the locking dog 41 to become disengaged from the sector 31a unless the handle member 37 has been brought into a position with notch 53 opposite dog 41. Thus the locking member 36 cannot be disengaged from the sector 31a until after it has been connected to the handle member 37.

While the notch 53 is shown as disposed adjacent the longitudinal center line of the handle member 37 it will be understood that it is not necessary that it be located at this particular point, but may be provided at any place along the shield 51.

In the operation of the implement described, after the plow has been adjusted to the desired depth of plowing the handle member 37 will be swung down upon the pin 52 in a substantially horizontal or idle position where it will be out of contact with low overhanging limbs of trees. Also, with the handle member 37 disposed in this idle position, it will swing downwardly below the tractor when the implement and tractor jackknife or swing toward each other in passing over ditches or uneven ground. This eliminates the danger of the operator being struck by the lever, and also prevents damage to the lever by reason of its coming in contact with some portion of the tractor.

It will be apparent that changes in the details of construction, and in the combination and arrangement of parts may be resorted to without departing from the spirit or scope of the invention as hereinafter claimed.

What I claim is:

1. In combination, a notched sector, a pivot pin on said sector disposed concentric therewith, a lever comprising a short locking member and a handle member, each of said members being mounted for independent pivotal movement on said pin, a locking dog slidably mounted on said locking member and adapted to selectively engage the notches on said sector, an arm on said dog normally disposed axially of said pin, an arcuate shield fixed on said handle member and disposed over said notched sector in close proximity thereto to prevent said dog being disengaged from said notched sector, said arcuate shield having an aperture in the inner edge adjacent one end thereof adapted to receive said dog when it is withdrawn from said notched sector, said dog when engaged in said aperture serving also to connect said locking member and said handle member, and means on said handle member engaging said arm on said locking dog to actuate said dog after said handle member has been adjusted to align said aperture with said dog.

2. In combination, a notched sector, a pivot disposed concentric with said notched sector, a lever comprising a short locking member and a relatively long handle member, each of said members being mounted on said pivot for independent pivotal movement, a locking dog slidably mounted on said locking member and adapted to selectively engage the notches on said notched sector, and means on said handle member permanently connected to said locking dog to actuate said locking dog.

3. In combination, a sector, a lever comprising a short locking member and a relatively long handle member, each of said members being mounted for independent pivotal movement, locking means on said locking member, means on said handle member connected with said locking means for actuating said locking means to lock said members together, said locking means also serving when disconnected from said handle member to secure said locking member to said sector.

4. A lever comprising a locking member, and a handle member, bearing means providing a common axis for pivotally supporting both of said members for independent pivotal movement, a locking dog slidably mounted on said locking member, an arm on said dog normally disposed substantially coaxial with said pivot, and a lever rod on said handle member connected with said arm to actuate said locking dog.

5. A lever comprising a locking member, and a handle member, said members being pivotally mounted for independent pivotal movement, a locking dog movably mounted on said locking member adapted to be moved into locking engagement with said handle member to lock said members together when said handle member is positioned in alignment with said locking member, and means to prevent movement of said locking dog relative to said locking member when said locking member and said handle member are not in alignment.

6. In combination, a sector, a lever comprising a pivotally mounted locking member and a pivotally mounted handle member, a locking dog on said locking member for selectively engaging said handle member on said sector, and means for locking said locking dog in engagement with said sector, said locking means being releasable only when said handle member is disposed in a certain position.

7. In combination, a sector having a recess, a lever comprising a pivotally mounted locking member and a pivotally mounted handle member, there being a recess in said handle member, and a locking dog mounted on said locking member and adapted to selectively engage one of said recesses for locking said locking member either to said handle member or to said sector, respectively.

8. In combination, a sector, a lever comprising a pivotally mounted locking member and a pivotally mounted handle member, means for selectively engaging said locking member with said handle member or with said sector, and means for positively preventing disengagement of said locking member from said sector until after said locking member has been engaged with said handle member.

9. In combination, a sector, a lever comprising a locking member and a handle member, said members being mounted for independent pivotal movement, locking means on said locking member for engaging said sector, and means to positively prevent disengagement of said locking means from said sector until said handle member is moved into a predetermined angular relation with said locking member.

10. In combination, a sector, a lever comprising a locking member and a handle member, said members being mounted for independent pivotal movement, locking means on one of said members for positively engaging said sector, and means for preventing disengagement of said locking means from said sector unless said members are disposed in a predetermined angular relation.

11. In combination, a sector, a lever comprising a locking member and a handle member, said members being mounted for independent pivotal movement, said handle member adapted to be moved into either a working or an idle position, locking means on said locking member for selectively engaging said sector, and said handle member, and means to positively prevent said locking means being disengaged from said sector when said handle member is in an idle position.

12. In an agricultural implement having a frame, a notched sector secured on said frame, a lever comprising a locking member and a handle member, locking means on said locking member adapted to selectively engage the notches of said sector, said handle member being movable into working engagement with said locking member to adjust said locking member into a working position upon the frame of the implement, and means on said handle member to positively prevent said locking means being disengaged from said sector when said handle member is in an idle position.

13. In combination, a sector, a lever comprising a locking member, and a handle member, said members being mounted for independent pivotal movement, a locking dog movably mounted on said locking member and adapted to optionally engage said sector, control means mounted on said handle member and pivotally connected with said locking dog for actuating said dog, and means for locking said dog against actuation by said control means when said members are disposed in a certain angular relation to each other.

14. A lever comprising a locking member, and a handle member, said members being pivotally mounted for independent pivotal movement, a locking dog on said locking member adapted to move into locking engagement with said handle member to lock said members together when said handle member is positioned in predetermined angular relation with said locking member, and means to positively lock said locking dog against being moved when said handle member is not in said predetermined angular position.

15. A lever comprising a locking member, and a handle member, bearing means pivotally supporting both of said members for independent pivotal movement in parallel planes, a locking dog shiftably mounted on said locking member, a lever rod on said handle member connected with said locking dog to actuate said dog, and means for positively locking said dog against being shifted when said members are disposed in a predetermined angular relation to each other.

16. In combination, a sector, a lever comprising a locking member and a handle member, each of said members being mounted for independent pivotal movement, a locking dog mounted on said locking member and adapted to selectively engage said sector or said handle member, said locking dog adapted to engage said handle member before it has been disengaged from said sector.

17. In combination, a sector having a notch in said sector, a lever comprising a locking member and a handle member having a notch in said handle member, a locking dog mounted on said locking member and adapted to selectively engage said notches in said sector or said handle member, said locking dog being adapted to engage the notch in said handle member before it has been disengaged from the notch in said sector.

WALTER H. SILVER.

CERTIFICATE OF CORRECTION.

Patent No. 2,150,660.

March 14, 1939.

WALTER H. SILVER.

It is hereby certified that error appears in the printed specification of the above numbered patent requiring correction as follows: Page 3, first column, line 19, claim 6, for the word "on" read or; line 55, claim 10, strike out "positively" and insert the same after "for", line 56, same claim; and that the said Letters Patent should be read with this correction therein that the same may conform to the record of the case in the Patent Office.

Signed and sealed this 9th day of May, A. D. 1939.

Henry Van Arsdale

Acting Commissioner of Patents.

(Seal)